July 5, 1938.  L. R. SMITH  2,123,124
GRASS GUARD FOR MOWERS
Filed Nov. 26, 1937   2 Sheets-Sheet 1
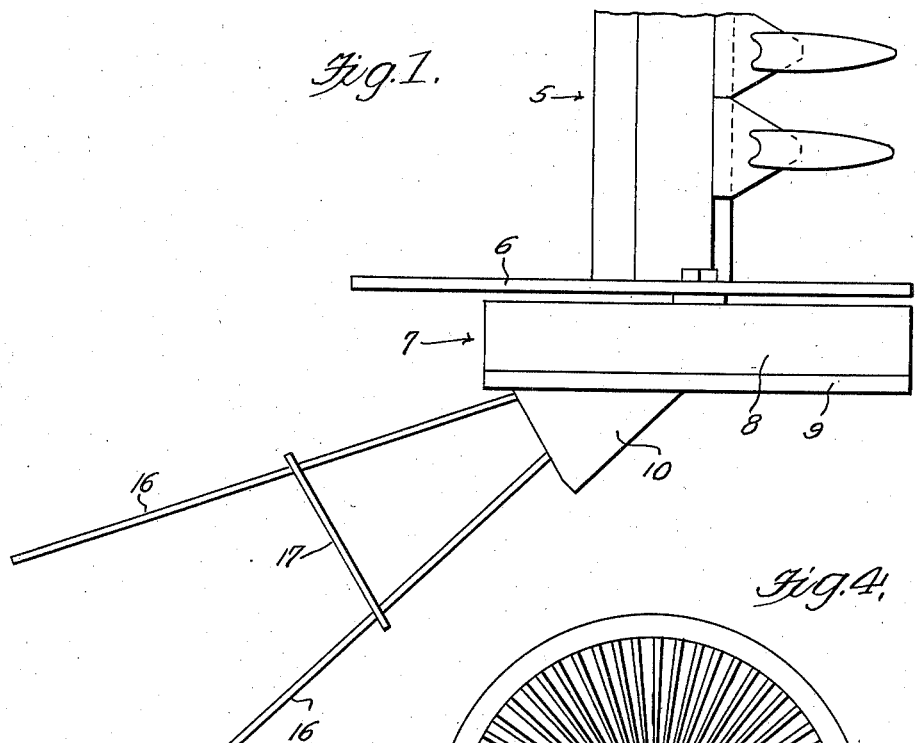
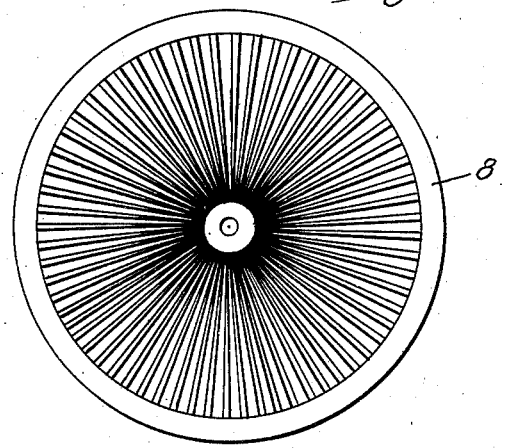
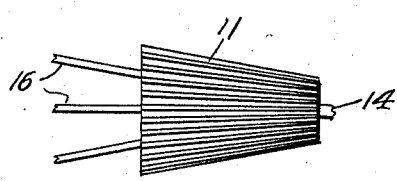
Inventor
Lewie R. Smith,
By Clarence A. O'Brien
Hyman Berman
Attorneys July 5, 1938.  L. R. SMITH  2,123,124
GRASS GUARD FOR MOWERS
Filed Nov. 26, 1937  2 Sheets-Sheet 2
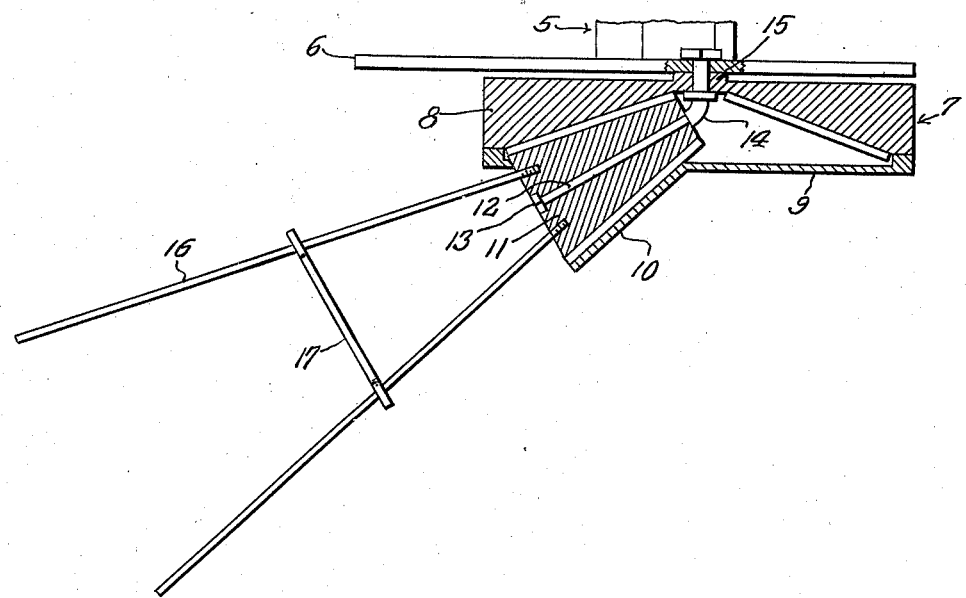
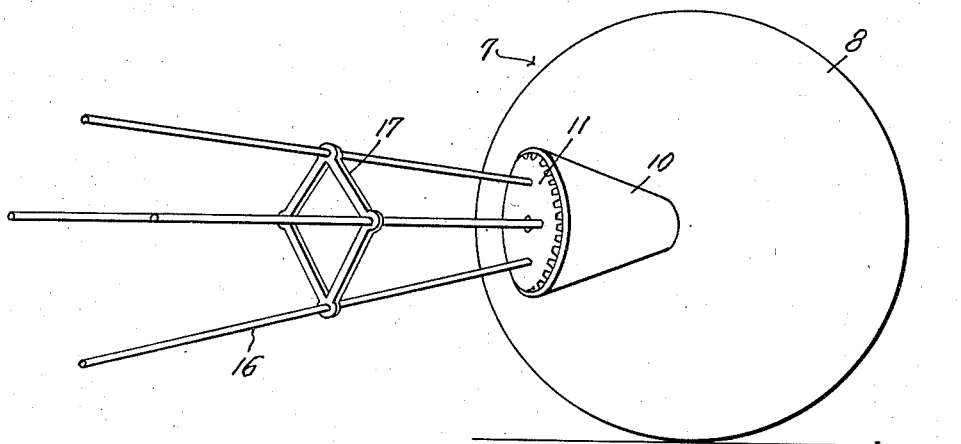
Inventor
Lewie R. Smith,
By Clarence A. O'Brien
Hyman Berman
Attorneys Patented July 5, 1938

2,123,124

UNITED STATES PATENT OFFICE 2,123,124

GRASS GUARD FOR MOWERS

Lewie Roberts Smith, Nampa, Idaho

Application November 26, 1937, Serial No. 176,710

1 Claim. (Cl. 56—317)

This invention relates to new and useful improvements in harvesting machines and more particularly to a grass guard for mowers.

The principal object of the present invention is to provide a grass guard for mowers which is adapted, while the mower is in operation, to automatically lift the grass and deflect the same to one side of the swath being cut by the mower.

Another important object of the invention is to provide a guard of the character stated which will not interfere with the efficient harvesting operations of the mower.

Another important object of the invention is to provide a guard of the character stated which will be positive acting and not susceptible to the ready development of defects.

These and various other important objects and advantages of the invention will become apparent to the reader of the following specification.

In the drawings:—

Figure 1 represents a fragmentary top plan view of a mower showing the guard mounted on the usual swathboard or shoe.

Figure 2 is a horizontal sectional view fragmentarily through the structure shown in Figure 1.

Figure 3 is an end elevational view of the structure shown in Figure 1.

Figure 4 is a side elevational view of the concave-gear.

Figure 5 is a fragmentary side elevational view showing the frustro-conical shaped gear of the guard.

Referring to the drawings wherein like numerals designate like parts, it can be seen that numeral 5 generally refers to the sickle assembly and the numeral 6 denotes the swathboard or shoe to which the guard generally referred to by numeral 7 is secured. This guard consists of the concaved-shaped gear 8 provided with the cover 9. This cover 9 is provided with the outwardly flaring shell 10 into which fits the frustro-conical shaped gear 11 of elongated construction. Extending through this gear 11 is the rod 12 threaded at its outer end and equipped with a nut 13. The inner end of this rod 12 is provided with the laterally disposed spindle portion 14 which is journaled through the bearing-like formation 15 of the gear 8.

The gear 8 is provided on its concave face with teeth with which the teeth on the periphery of the gear 11 mesh as is clearly suggested in Figure 2.

A plurality of rods 16 flare outwardly from the outer end of the gear 11 and suitable connectors 17 can be provided between these rods. As the gear 8 rides along the ground, the conical-shaped gear 11 is rotated and this imparts a rotary movement to the fabricated arrangement of rods 16 so that the necessary engagement of the rods with the grass is accomplished.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In combination with the swathboard of a mowing machine, an outwardly extending spindle supported by said swathboard, a wheel rotatably arranged on the spindle and having a substantially conical concavity in its outer face, the walls of which are provided with radiating teeth, a cover attached to the outer face of the wheel, an outwardly and rearwardly flaring shell carried by the cover and said cover having an opening therein which registers with the interior of the shell, a frustro-conical-shaped gear having a part located in the shell and a part in the concavity with its teeth engaging the teeth of the wheel, a rod on which the gear is journaled and the outer end of the spindle having a curved portion connecting with the inner end of the rod, outwardly flaring bars connected to the outer end of the gear and a transverse member having holes therein through which the bars extend.

LEWIE ROBERTS SMITH.